Jan. 24, 1967   M. FOEX   3,300,561
METHODS AND DEVICES FOR HEATING SUBSTANCES BY MEANS
OF RADIANT ENERGY AND PLASMA HEAT SOURCES
Filed Sept. 25, 1963   7 Sheets-Sheet 1

//3,300,561
**METHODS AND DEVICES FOR HEATING SUB-
STANCES BY MEANS OF RADIANT ENERGY
AND PLASMA HEAT SOURCES**
Marc Foex, Paris, France, assignor to Centre National
de la Recherche Scientifique, Paris, France, a society
of France
Filed Sept. 25, 1963, Ser. No. 311,421
Claims priority, application France, Sept. 29, 1962,
910,820; Apr. 11, 1963, 931,314
8 Claims. (Cl. 13—3)

High energetic colorific radiations supplied by various types of apparatus, such as sun furnaces and image furnaces permit essentially of heating to a high temperature condensed substances (i.e. solid or liquid substances) capable of absorbing the incident radiation either directly or by successive reflections. This kind of apparatus is particularly well adapted to the melting of substances without contamination thereof. It is much more difficult to heat in this way gases or vapors, the absorption of the radiation being then very small. However it is possible to proceed to thermal exchanges on hot walls or surfaces located in the focal zone, but the efficiency that is obtained is generally low when it is desired to heat the gases at a high temperature, close to that of the wall.

On the other hand, plasma apparatus such as plasma blowpipes directly heat the gases to very high temperatures, higher than the boiling points of the most refractor substances, but it is often rather difficult to use them with a good efficiency for heating condensed substances.

The present invention permits of combining the advantages of the two above mentioned methods. It is essentially characterized by the fact that use is simultaneously made of plasmas and of high energetic illumination radiations to bring to a high temperature, solid, liquid or gaseous substances.

These mixed heating methods permit of bringing the condensed product to a higher temperature than could be possible by using only one of these methods. As a matter of fact the temperature (15,000° C. for instance) of the hot gases of the plasma is generally much higher than the theoretical maximum temperature that can be used at the present time with image furnaces comprising an electric source. Furthermore, it should be noted that sun furnaces do not permit of exceeding the temperature of the surface of the sun (5,000° C.), radiation losses then balancing the energy that is received. By way of comparison, it should be noted that a relatively little warm ordinary blowpipe flame considerably limits the maximum temperature to be reached at the focus of a sun furnace. The supply of radiated energy does not, as a rule, limit the temperature of the plasma.

In order to realize the possibilities supplied by such mixed mountings, it is advisable to consider not only the temperatures of the plasmas but also the energies that can be fed to the treated product, placed for instance in the focal plane. It seems easy to obtain with a conventional image furnace or sun furnace energetic illuminations averaging one or two kw./cm.² or even some tens of kw./cm.² with plasma blowpipes (arc plasma).

It should be noted that "soft plasmas" as obtained with torches having their plasma created by a high frequency give lower energies which often do not exceed some kw. or even some hundredths of watts per square centimeter. However these last mentioned plasmas have a particular interest, because they permit of working in the absence of electrodes, that is to say in better conditions of cleanliness, with the possibility of using gases such as oxygen or air. Furthermore the velocity of the gaseous stream is much lower than in the case of the plasma blowpipe, which permits of avoiding abrasion of the coherent substances and sudden illumination of non agglomerated powdery products.

The temperature reached in radiation furnaces depends upon the emission factors of the substances that are treated both for the wavelengths corresponding to the incident radiation and for those relative to the radiation emitted by the substance (when the temperature is high, these bands of wavelengths are close to each other). Thus the highly reflective metals, when their surface is unaltered, or the very white substances in the powdery state are difficult to bring to a high temperature by the action of a short wavelength radiation such as that produced by an arc or by the sun.

Plasmas transmit their energy substantially in the same manner to all the substances, whatever be their factor of emission, but it is easier through this method to bring to a high temperature products having a low emission factor, loosing little energy by radiation, than substances radiating strongly in the hot state. Thus metals are molten much better than most of the other products.

The above discussion shows in what conditions it is possible to combine the action of plasmas with that of radiations having a high energetic illumination to obtain higher temperatures. This is not the only advantage of these mixed methods. The following cases should also be cited.

First it is possible to preheat, by means of a plasma, white powdery products which badly absorb the radiations of image furnaces or sun furnaces. As a matter of fact, once sintered at high temperature, or molten, these products (such as thorium oxide, magnesia . . .) then become highly absorbing and their melting can be continued by means of only the radiating source.

Combination of the preceding heating means permits of obtaining many chemical reactions between a gaseous phase and a condensed (solid or liquid) phase. Many operations can be effected on this principle, for instance reductions of various products by the action of highly ionized hydrogen, preparation of various nitrides by means of a nitrogen plasma or against formation of carbides by means of hydrocarbons such as acetylene.

The devices for carrying out the invention must be made in such manner that the incoming radiation is masked as little as possible by the blowpipe or the furnace containing the substance to be treated.

The invention also relates to furnaces, and in particular to furnaces for the treatment of materials at high temperature, and in particular to furnaces comprising on the one hand a centrifugal chamber containing the materials to be treated, such as refractory materials, none conductors of electricity at ordinary temperature, these materials then being preferably of a powdery or granular form, and on the other hand high temperature heating means located close to the inlet, preferably an axial one, of said centrifugal chamber, such means consisting in particular of sun or image furnaces, or plasma blowpipes.

Such furnaces may be for instance of the type disclosed in my United States patent application Serial Number 240,251 filed November 27, 1962, for "Improvements in Heating Devices Making Use of Plasma Torches and in Corresponding Methods." They may also be of the type above mentioned in the present application.

However said heating means, which serve first to heat the materials to be treated to a high temperature, then to keep them at this temperature, have the drawback of creating, in said chambers, a zone of high temperature only in the proximity of the inlet thereof.

Such an arrangement has for its consequence, on the one hand, a considerable loss of thermal energy on the outside of said chamber, and, on the other hand, a sometimes unfavorable distribution of the energy that is recuperated on the inside of the chamber.

One of the objects of the invention consists, while associating in a furnace of the type in question a chamber containing the materials to be treated and heating means located on the outside of this chamber, in dividing said chamber into at least two metallic portions separated and insulated from each other by a piece made of a material which is not a conductor of electricity, in providing means for placing said two metallic portions at different potentials so as to produce a heating electric circuit on the inside of the chamber capable of cooperating with heating means located on the outside of the chamber and even, at high temperature, of replacing them, this electric circuit being closed through gases or vapors heated at high temperature and partly ionized and/or through the molten portion at high temperature of the material treated which, due to its melting, is made conductive of electricity.

According to still another feature of the present invention, relating to the case where the above mentioned external heating means associated with the chamber consist of one or several plasma blowpipes, there is provided, between one of the electrodes of the plasma blowpipe and at least one of the portions of the chamber, a connection so that after melting has been started inside the chamber by the action of the internal arc plasma blowpipe, a displaced arc is obtained between said chamber and said blowpipe.

Preferred embodiments of my invention will be hereinafter described with reference to the appended drawings, given merely by way of example, and in which.

Figure 1:
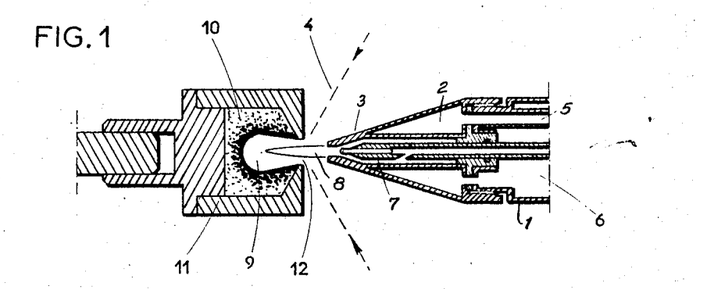
FIG. 1 is a diagrammatic axial sectional view of a blowpipe having a sharp head associated with a furnace which is preferably rotating.

As shown by FIG. 1, plasma blowpipe 1 is provided with a cooling chamber 2 of sharp shape, surrounding anode 3, the solid angle thus formed being small as compared with that of the cone 4 formed by the radiation. Cooling water arrives through tube 5 and escapes through orifice 6. Between cathode 7 and anode 3 there is formed an electric arc, which creates plasma 8 which enters recess 9 containing the substance 10 to be treated. This substance is contained in a rotary furnace 11 driven through means not shown by the drawing. The end of the blowpipe is preferably slightly offset with respect to the focal plane, or plane of strong concentration of the energy produced by the radiation. The product to be treated may be placed in this plane, but if use is made, as in FIGS. 1, 2 and 3, of a rotary furnace, the plane of maximum concentration of the radiating energy is made to coincide with the inlet of the furnace. The jet of plasma penetrates through aperture 12 and the substance placed in the cavity, subjected to the combined actions of the radiation and of the plasma, is heated to very high temperature.

Figure 2:
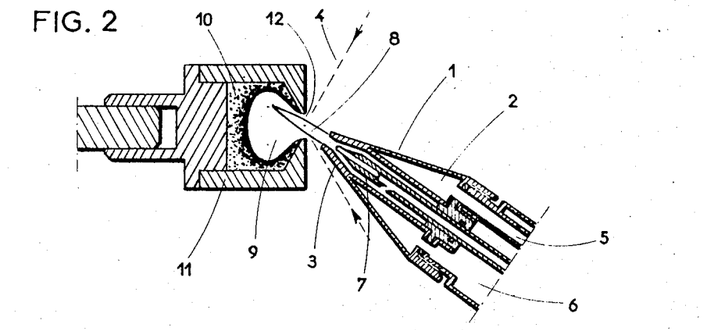
FIG. 2 is a view analogous to FIG. 1 where the blowpipe is inclined.

FIG. 2 shows a device analogous to that of FIG. 1, but wherein the blowpipe is inclined with respect to the axis of rotation of the furnace. Such an arrangement may be useful in some cases to facilitate ingress of the radiation to the inside of the furnace.

Figure 3:
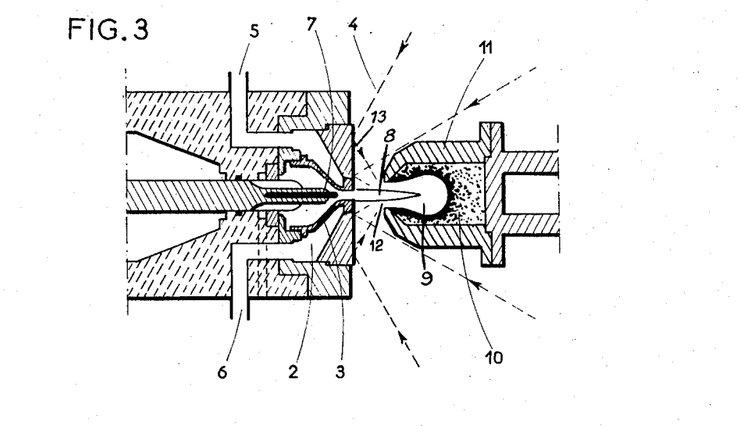
FIG. 3 illustrates the case where the radiation reaches the furnace after having undergone a reflection on the front face of the blowpipe.

In the device shown by FIG. 3, use is made of a plasma blowpipe of conventional shape, but the cooled front face 13 of large section is made reflecting by polishing or by silvering. This reflecting surface is disposed a little ahead of furnace 11 so as to obtain by reflection a focalizing of the radiation in the intermediate portion of the flame of the plasma blowpipe. It is the position where may be placed the product to be treated but use may also be made, as shown by FIG. 3, of a centrifugal furnace, provided that this furnace is made in such manner as to stop as small a portion of the radiation as possible. For this purpose, the portion adjoining the opening is thinned down into conical shape.

Figure 4:
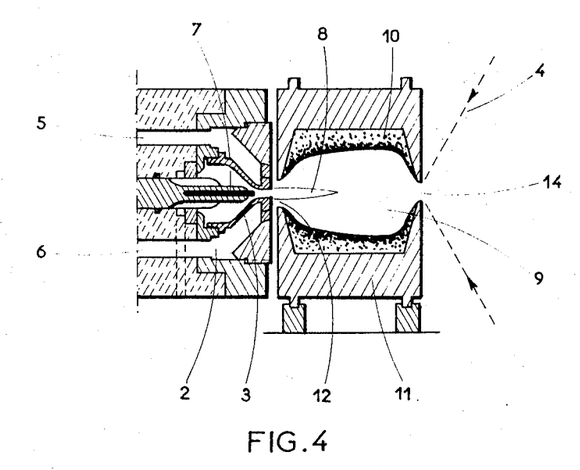
FIG. 4 relates to the case where the substance to be treated is located in a rotary furnace provided with two openings, one of which acts as inlet for the plasma and the other as inlet for the radiation.

The device illustrated by FIG. 4 shows how the cooled rotating furnace 11 may be provided with two opposed openings 12 and 14, the plasma of the blowpipe passing through the first of these openings and the second of them receiving the radiation.

Figure 5:
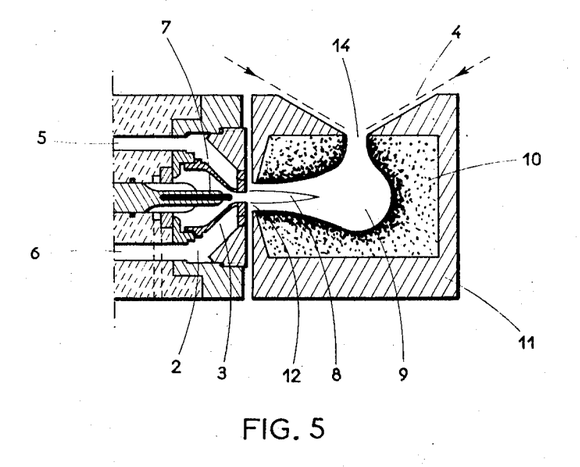
FIG. 5 shows an arrangement analogous to that of FIG. 4 but with a stationary furnace.

The device shown by FIG. 5 also comprises two openings 12 and 14 and it relates to the case where the furnace is a fixed furnace.

Figure 6:
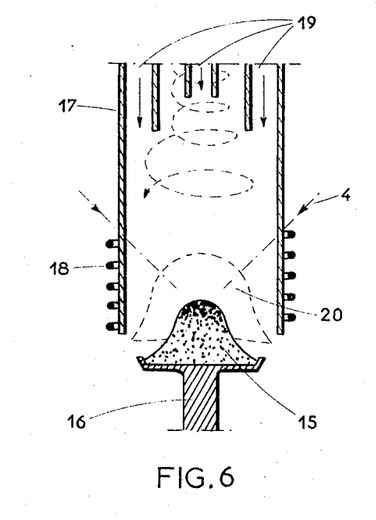
FIGS. 6, 7 and 8 relate to devices wherein the plasma is obtained by means of a high frequency current.
Figure 7:
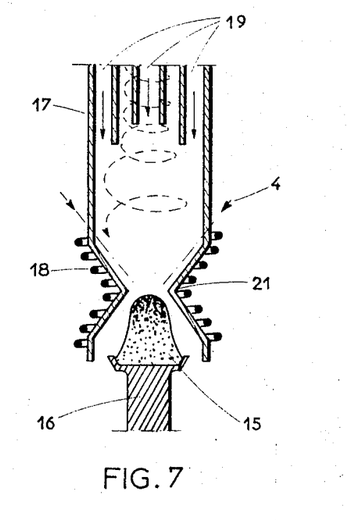
Figure 8:
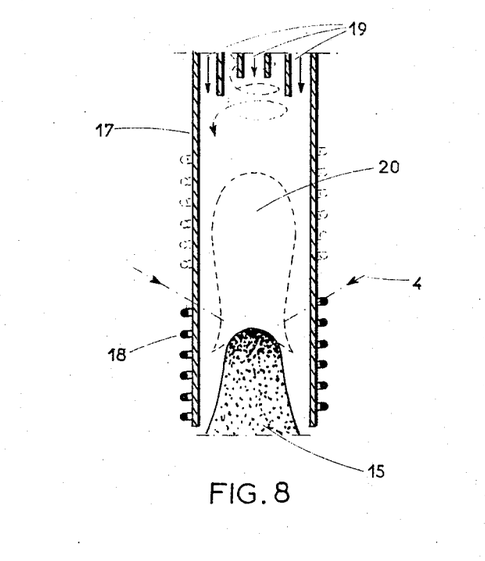

Instead of a plasma blowpipe working by means of an arc, it is often advantageous to use a plasma heated by high frequency induction in an insulating tube. FIGS. 6, 7 and 8 relate to such a device and show axial sectional views thereof respectively. In these figures, the substance 15 to be treated is placed on support 16 and, above it, there is provided a transparent insulating tube 17. I may for instance use a transparent silica tube which permits passage of most of the radiation supplied by an image furnace or by a device for concentrating sun energy. The lower portion of the tube is provided with a winding 18 which permits of energizing the gas for the formation of plasma. The gas arrives to the upper end through several orifices 19. Under the influence of the energizing produced by the high frequency winding, a plasma 20 is formed above the substance 15 to be treated. Advantageously this substance is given a movement of rotation, its support being driven by a device not shown by the drawing. The radiation cone 4 passes through the transparent silica tube and the energy is concentrated on the substance to be treated which is thus subjected to the combined actions of radiation and of the plasma.

FIG. 7 shows a modification where the silica tube comprises a throttled portion 21 which facilitates the formation of the plasma.

FIG. 8 shows how the plasma can be formed at different heights by varying the position of the winding through which pass the high frequency currents.

It should be noted that in the last mentioned three embodiments, the product that is treated may also be heated by the high frequency induction. This possibility may be particularly interesting in the case of an insulating product made conductive by preliminary heating at high temperature, which is the case of many refractory substances and in particular of various oxides.

White powdery products, which have a bad capacity of absorbing the radiation of image furnaces, may be preliminarily heated to high temperature by means of a plasma torch, the melting once started generally going on by the mere action of the radiation of the image furnace or by the combined action of this radiation and of the high frequency induction.

Of course the above described devices should be considered as non limitative examples and it should be noted that in many cases it is possible to substitute capacitive devices for the self inductance mountings shown by FIGS. 6, 7 and 8.

In the constructions illustrated by FIGS. 9–17 for the treatment at high temperature of materials which are preferably of powdery or granular nature and which are not conductors of electricity, I proceed as follows.

Concerning first the furnace as a whole, and with the exception of the centrifugal chamber 101 which is to contain the materials to be treated (which as above stated are preferably of powdery or granular nature), it may be made in any suitable manner and in particular include known means for rotating said chamber 101 and heating means 102 on the outside thereof, such as at least one plasma blowpipe or a sun or image furnace.

Concerning now the chamber itself, it is divided into at least two metal portions 103–103a and 104 (FIG. 9) separated and insulated from one another by a piece 105 made of a material which is not a conductor of electricity, and means are provided for placing said metal portions 103 and 104 to different respective potentials in order to form an electric heating circuit 106 inside chamber 101 capable of cooperating with heating means 102 located on the outside of chamber 101 and even, possibly at high temperature, of replacing said last mentioned heating means, the closing of this heating circuit 106 being ensured through gases or vapors 107 at high temperature and partly ionized and/or through the molten portion 108 at high temperature of the material that is treated, which becomes electricity conductive.

Figure 9:
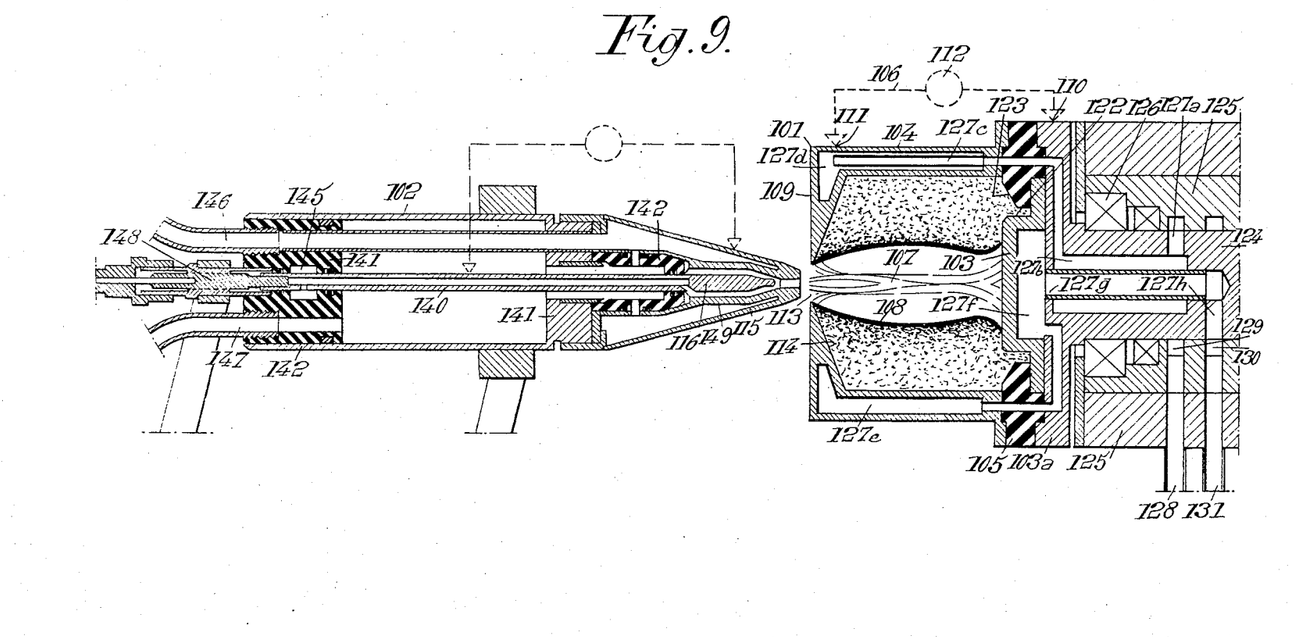
FIG. 9 shows, in axial section, a furnace made according to the invention.

According to an advantageous embodiment of my invention illustrated by FIG. 9, the end wall 103 of chamber 101 is separated and electrically insulated from the cylindrical body 104, which comprises the front wall 109 of said chamber, by an annular part 105 made of a material which is not a conductor of electricity, such as asbestoes or a compound of asbestoes and of a refractory product. Movable contacts permit of connecting these portions 103 and 104, respectively at 110 and 111, with a generator 112 capable of supplying a direct or alternating current and of bringing these portions 103 and 104 at different respective potentials.

Materials, generally refractory and non electricity conductive, preferably in the powdery or granular state, are packed in the known manner in chamber 101 and subjected to the action of external heating means 102 in the vicinity of the inlet 113 provided in the front wall 109.

Said heating means 102 preferably consist of a plasma blowpipe, which has the advantage not only of being a very important source of heat but also of supplying the very hot and partly ionized gaseous stream 107 which will permit the closing of the above mentioned electric heating circuit 106 when, under the combined actions of the plasma jet and of the centrifugal force, a recess of revolution extending as far as the end wall 103 of chamber 101 is formed in the material treated.

Furthermore, the plasma blowpipe permits, if so desired, of treating the materials in chamber 101 out of contact with air and in a given atmosphere, if the gas which constitutes this atmosphere also constitutes the plasma jet.

It is only when the end wall 103 of chamber 101 is cleared that current will be capable of passing from portion 104 to said wall 103 through the intermediate of the plasma jet, which will have for its effect to create a supplementary electric arc in chamber 101 cooperating with the plasma blowpipe 102. I thus obtain a considerable increase of the heating power available inside chamber 101, the main advantage of this increase lying in the great rapidity of treatment of the materials contained in said chamber.

Of course, the cavity of revolution formed in the material by means of the plasma blowpipe 102 might be preestablished in said material in any suitable manner so as to bring more quickly into action, if so desired, the electric arc formed inside chamber 101.

Other physical phenomenons are brought into play and cooperate in the formation of the supplementary heating electric arc inside chamber 101. These phenomenons on the one hand may even replace completely for this purpose the plasma jet, in particular when the heating means on the outside of the chamber consist for instance of sun furnaces or image furnaces. On the other hand these phenomenons permit, when the electric arc has been started inside chamber 101, of maintaining said arc while reducing and possibly stopping the action of heating means 102.

Thus the layer 108 of molten products which constitutes the inner wall of the cavity formed in the material under treatment by the plasma blowpipe 102 (or by any other external heating means) contributes in facilitating the formation of the electric arc inside the chamber. If the refractory materials are not conductors of electricity at ordinary temperature, most of them become conductive in the vicinity of their melting point.

Concerning the inner wall 114 of the inlet face 109 of chamber 101 about inlet opening 113, it is advantageous, according to the invention, to arrange it so that it makes a small angle with the external surfaces of wall 109 so that, in the vicinity of inlet 113, the metal wall, if it is suitably cooled, is thin so as to reduce energy losses.

Furthermore the gases or vapors other than those of plasma jet 107 which are present in chamber 101 during the treatment may also serve to convey electric current inside the chamber.

These gases or vapors result in particular from the atmosphere in which the treatment is performed, from the vapor tension of the material treated and, possibly, from the gases produced by chemical reactions inside said materials.

Concerning the atmosphere in which the treatment is performed, it is known that monoatomic gases are more easily ionizable than diatomic gases. For instances argon is more easily ionizable and can consequently more easily permit the passage of current than nitrogen.

In particular, when the materials to be treated are brought to a temperature of the order of 3000°–3500° C., which may be obtained both with a plasma blowpipe and with a sun or image furnace, in an argon atmosphere, it is found that this atmosphere is slightly ionized in contact with the molten materials, which enables it, in these conditions, to participate in the transmission of electric current.

The vapor tension of said materials may become preponderating for the passage of the electric current of circuit 106 from portion 103 to portion 104 inside chamber 101.

In the case, for instance, where the material that is treated comprises components such as alkaline oxides, some rare earth oxides, alumina, or chromium oxide $Cr_2O_3$, these oxides already have, at a temperature of above 1000° to 1500° C., important vapor tensions, the vapors being good conductors of electricity. Said vapors may then, in the absence of a plasma jet, constitute the main vehicle for the electric current in chamber 101, the atmosphere in which the treatment is performed being practically not ionized at such temperatures.

The distribution of current between the different ways which have been considered will depend, in every case, upon the conditions of treatment, and in particular upon the relative case with which electric current will flow through the gases and the molten respectively present in chamber 101.

The same will be true of the difference of potential to be applied between the portions 103 and 104 of chamber 101, this difference of potential further depending, when the heating means 102 consist of a plasma blowpipe, upon the characteristics thereof, in particular upon the nature of the gas from which the plasma jet has been formed and upon the flow rate thereof.

When this flow rate is increased, the starting of the inner arc is facilitated. It is pointed out that the potential to be applied across portions 103 and 104 varies in a direction opposed to the variation of this output.

Values of these potential differences to be applied across portions 103 and 104 will be given hereinafter. Of course, these potential differences also depend upon the dimension of chamber 101.

The temperature reached inside chamber 101 is limited, on the one hand, by the melting heat of the materials treated, and on the other hand, particularly when the heating means 102 consist of plasma blowpipes, upon the volatilization effects, in particular in contact with very hot plasma jet when the energy supplied by the latter is sufficient.

When working at ordinary pressure, common refractory materials may be treated at temperatures of the order of 2000° to 3000° C., where they can be maintained in the liquid state.

But if the whole furnace is disposed in a closed vessel where the operation may be effected under pressure, it is possible, when the heating means 102 consist of a plasma blowpipe, to increase the temperature inside the molten mass due to the increase, as a function of the pressure, of the temperatures of vaporization of the materials that are treated. Under a pressure of about one hundredth atmospheres, some of the materials in question may be kept in the liquid state under a temperature ranging from 4000° to 5000° C.

In the embodiments considered up to now and described with reference to FIG. 9, there is only one inlet aperture 113 in chamber 101.

Figure 11:
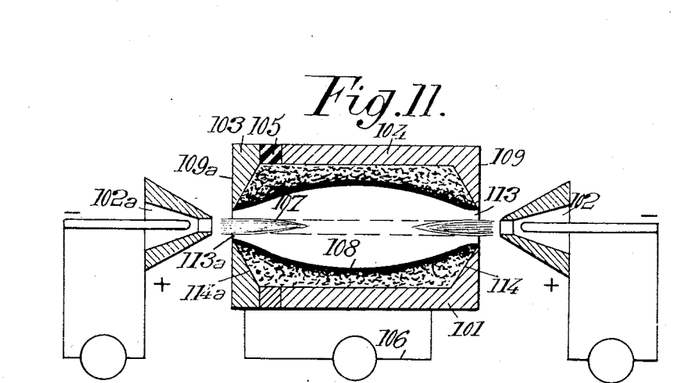
FIGS. 11 to 17 are diagrammatic views showing different arrangements of furnaces made according to the invention.
Figure 12:
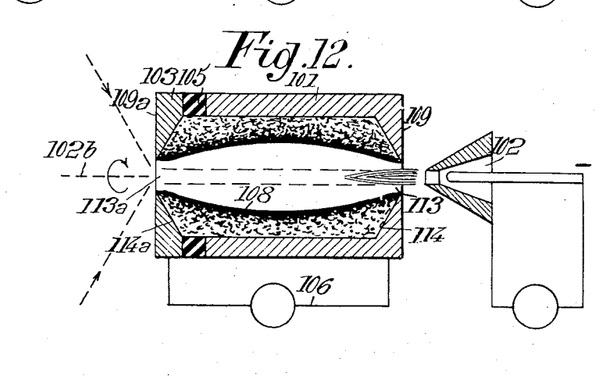

Of course I may provide furnaces comprising a centrifugal chamber with two axial inlets 113 and 113a in its opposed faces 109 and 109a, for instance as shown by FIGS. 11 and 12. This chamber consists, as in the preceding case, of two portions 103 and 104 separated and insulated from each other by an annular portion 105 made of an insulating material, this chamber 101 comprising an electric heating circuit 106 closed through the gases introduced into chamber 101, for instance by means of two plasma blowpipes 102 and 102a disposed close to the inlet 113 and 113a of chamber 101 (FIG. 11) and/or through the intermediate of the layer 108 of molten product.

In this case, the inner walls 114 and 114a must preferably both make a small angle with the inlet faces 109 and 109a, respectively, for reasons above stated.

Of course the heating means 102 associated with these furnaces may be made in any suitable manner. For instance, I may replace the plasma blowpipe 102a of the embodiment of FIG. 11 by a sun furnace or image furnace 102b (FIG. 12), the action of said heating means being possibly reduced or even cancelled once the inner arc has been started in the furnace.

In the embodiments which have been described and more especially in those where the centrifugal chamber 101 containing the materials to be treated is associated with at least one plasma blowpipe, the electric circuit of this blowpipe and the inner electric heating circuit 106 disposed in the chamber are fed from different generators, respectively, and always remain independent from each other.

It is also possible, according to another feature of the invention, to provide a connection between either the anode 115 or the cathode 116 of an internal arc plasma blowpipe and at least one of the portions of the chamber so that, after melting has started inside the chamber by the action of the internal arc plasma blowpipe 102, there is obtained an arc between the chamber and said blowpipe.

Such connections may be established in many different ways. FIGS. 13 to 17 show some examples thereof in an illustrative but not limitative fashion.

Figure 13:
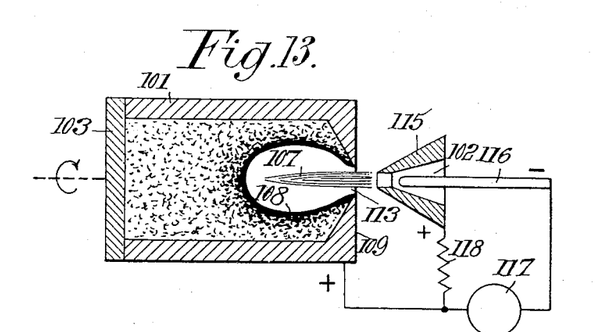

FIG. 13 shows one of the simplest devices for replacing the arc between an internal arc plasma blowpipe and the inlet face 109 of chamber 101.

The plasma blowpipe 102 is fed from a direct current generator 117. I provide between said generator and the anode 115 of the blowpipe a variable resistor 118. Furthermore the positive terminal of generator 117 is also connected to the metal inlet face 109 of chamber 101.

After powder has been packed in chamber 101, preliminarily to the treatment, plasma blowpipe 102 is placed at a distance from the inlet 113 of the chamber and brought into operation, resistor 118 having a minimum value.

As, under the combined actions of plasma jet 107 and of the centrifugal force, there is formed inside the material under treatment a cavity of revolution lined with the molten material, plasma blowpipe 102 is moved nearer and nearer the inlet 113 until the following circuit is closed: cathode 116, generator 117, inlet face 109, plasma jet 107 and/or molten layer 108 and cathode 116. The closing of the circuit may be obtained for instance by increasing the resistance of resistor 118, such an increase having for its effect to make the potential of the anode of the blowpipe lower than the potential of the face 109 of chamber 101. This produces a transfer of the positive terminal of the arc from the anode 115 of the blowpipe to the face 109 of the chamber. Consequently, when the resistance of resistor 118 reaches a sufficient value, the arc of the plasma blowpipe is shifted toward the inside of chamber 101 and the available energy is better used. The resistance of resistor 118 may be further increased and in some cases the connection between generator 117 and anode 115 may be cut off.

I may even consider a supplementary transfer of the arc to the end wall 103 of the chamber provided that the latter is made, as above described, of two portions 103 and 104 separated from each other by an annular portion 105 made of an insulating material. I then provide connections between generator 117 and the portions 103 and 104 of the chamber respectively (FIG. 14) and I insert in the connection between generator 117 and portion 104 a resistor 119 of adjustable resistance.

Figure 14:
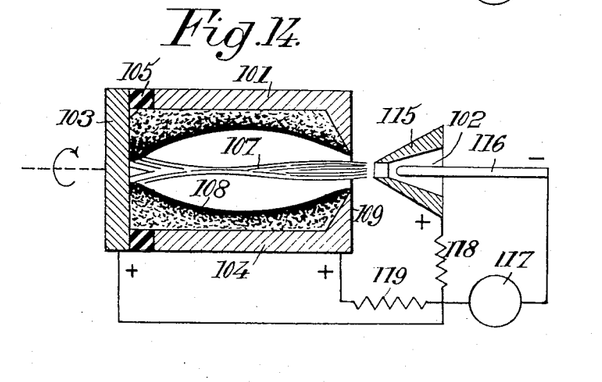

When the treatment is started, both of the resistors 118 and 119 have their minimum values respectively, and the plasma blowpipe is located at some distance from the opening 113 of the chamber. In the same conditions as in the preceding case, by increasing the resistance of resistor 118, the following circuit is closed: cathode 116, generator 117, resistor 119, part 104, plasma jet 107 and/or molten layer 108, cathode 116. When the recess formed in the material that is treated reaches the end wall 103 of the chamber, the circuit comprising the following elements is closed: cathode 116, generator 117, end wall 103, plasma jet 107 and/or molten layer 108 and cathode 116, this operation being made possible by increasing the resistance of resistor 119. This increase of the value of resistor 119 has for its effect to make the potential of face 109 less positive than that of end wall 103, so that the positive terminal of the arc is transferred from the inlet wall 109 to the end wall 103 of chamber 101. The value of resistor 119 must however preferably remain lower than that of resistor 118 so as to create increasing potential differences between cathode 116 and respectively anode 115, portion 104, and the end wall 103, the connections between generator 117 and respectively anode 115 and portion 104 being possibly in some cases cut off one after the other, the main current passing directly from cathode 116 to the end wall 103 of the chamber.

Figure 15:
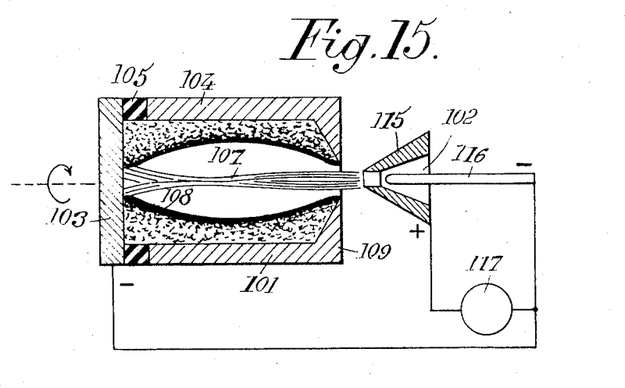

According to another embodiment illustrated by FIG. 15, the negative terminal of generator 117 may be directly connected to the end wall 103 of chamber 101. The plasma blowpipe 102 works in conventional manner during the whole time the cavity of revolution is formed inside the material that is treated. When the molten and electricity conductive product comes into contact with the end wall 103, the latter may then act as cathode and I obtain the formation of a supplementary arc between the anode 115 of blowpipe 102 and end wall 103 which may be substituted for the internal arc of the blowpipe if cathode 116 is disconnected from generator 117.

Figure 16:
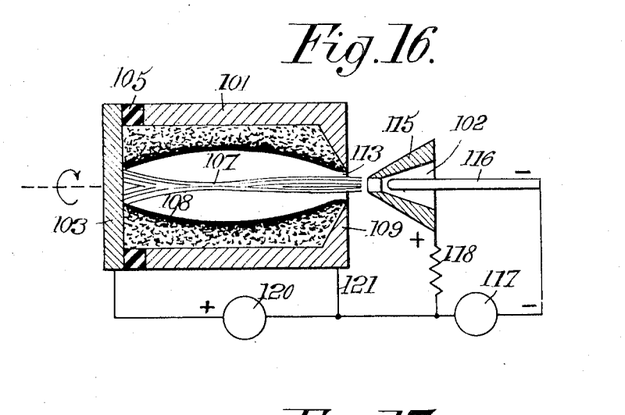

In the embodiment illustrated by FIG. 16, I associate with the generator 117 which feeds current to plasma blowpipe 102 a generator 120 mounted in series with the first one.

Generator 117, which feeds current to blowpipe 102, is connected on the one hand to the inlet face and on the other hand through generator 120 (which may be a direct current or alternating current generator) to the end wall 103 of chamber 101. Once the positive terminal of the arc has been transferred first to the inlet wall 109, then to the end wall 103 of chamber 101, it is possible with a direct current generator 120, either to create the following electric circuit—cathode 116, generator 117, generator 120, end wall 103, plasma jet and/or molten layer 108, and cathode 116—or merely to close the internal circuit of chamber 101, plasma blowpipe 102 being set to have a reduced action or even being brought out of action.

Figure 17:
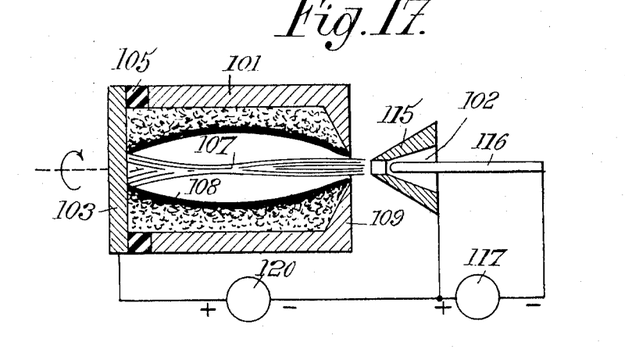

It is possible in this case, and when generator 120 supplies direct current, to cancel the common connection 121 leading from generators 117 and 120 to the front wall 109 of chamber 101, and also resistor 118. Such an arrangement is shown by FIG. 17. In this way, I easily obtain the transfer of the arc to the end wall 103 of chamber 101 when the molten material comes into contact therewith, its potential being then substantially more positive than that of anode 115 with respect to cathode 116.

To bring into evidence the gain of energy obtained in chamber 101 and the better utilization of the energy supplied by the blowpipe, I made the following experiment with a small centrifugal chamber 101 cooperating with a plasma blowpipe 102, said chamber and said blowpipe being mounted as illustrated by FIG. 17.

Chamber 101 in which were placed 500 gr. of alumina, had a diameter of 60 mm. and a length of 100 mm.

The plasma blowpipe was fed from a generator 117 capable of supplying a current of 420 amperes under a potential difference of 22 volts, the power being thus 9.24 kw. It was found that 4.43 kw. out of this energy was lost in the cooling water of the blowpipe when the latter was alone in operation.

I formed a cavity of revolution in the alumina contained in the centrifugal chamber by means of the plasma blowpipe. Within three minutes the wall of the cavity moved sufficiently far in chamber 101 to permit the striking of an arc between the end wall 103 of the chamber and the cathode 116 of the blowpipe.

The difference of potential supplied by means of generators 117 and 120 between the end wall 103 of chamber 101 and the cathode 116 of the blowpipe was 55 volts before the striking of the above mentioned arc. When this arc was started, this potential difference dropped to 50 volts and a current of an intensity equal to 25 amperes was measured on end wall 103.

By increasing the argon output of the blowpipe to 50 liters per minute, this potential difference was reduced to 30 volts and the intensity of current measured on end wall 103 passed to 120 amperes.

A reduction to 330 amperes of the current at the anode of the plasma blowpipe was observed. The current at the anode of the plasma blowpipe was therefore 330 plus 120, that is to say 450 amperes. At the same time, it was noted that the energy wasted in the cooling water of the plasma blowpipe was only 2.8 kw. I thus obtained on the inside of the chamber a considerable energy with a much more favorable efficiency of the energy supplied by the blowpipe.

In all the above described embodiments, where chamber 101 is made of two portions 103 and 104 separated from each other by an insulating piece 105, I advantageously provide, opposite the portions of said insulating part 105 that are in contact with the material to be treated, metallic surfaces, preferably integral with the walls of chamber 101, forming protection screens for the insulating material against the direct action of the heat developed inside the chamber.

Thus in the embodiment of FIG. 9, the end wall 103 of chamber 101 includes a projecting central portion, the lateral surface 122 of this projection protecting the portions 123 of annular element 105 which are in contact with the material to be treated against the direct action of the plasma jet.

Figure 10:
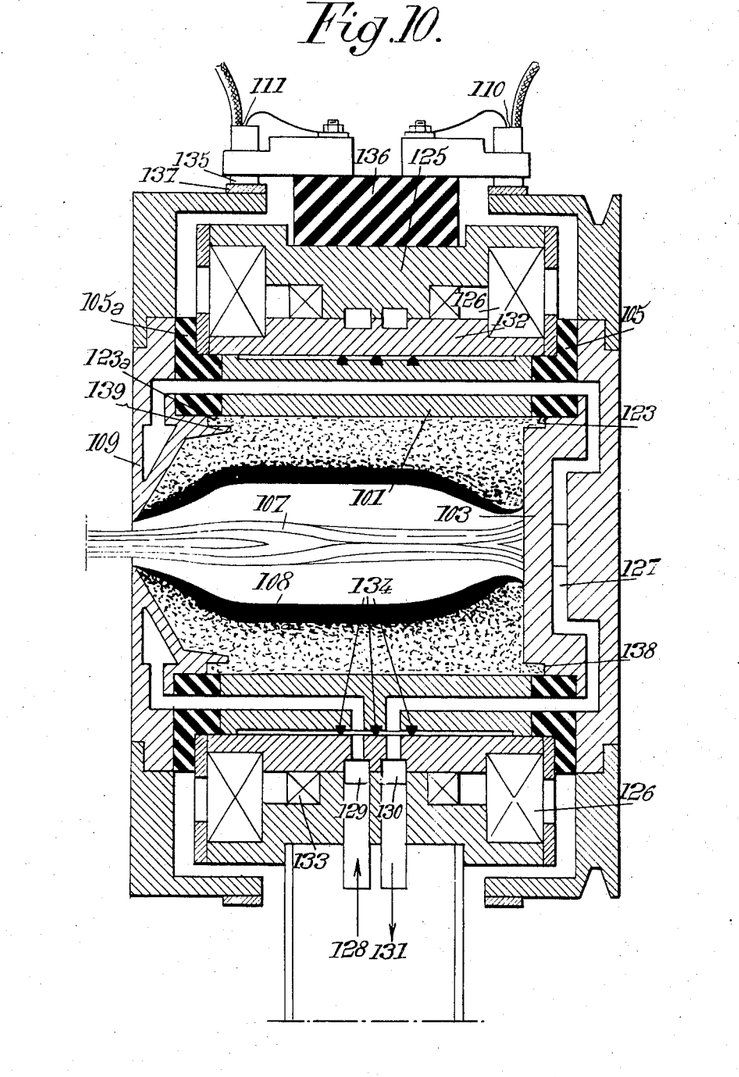
FIG. 10 shows, also in axial section, a portion of a furnace made according to a modification of that of FIG. 9.

Advantageously, I make use of the arrangements shown by FIGS. 9 and 10.

In FIG. 9, a centrifugal chamber 101 is mounted on the end of a rotating shaft 124 rotatable in fixed frame 125 with the provision of a bearing 126.

The internal dimensions of chamber 101 are as follows: length 70 mm. and diameter 80 mm.

The circuit 127 for cooling chamber 101 is fed by means of shaft 124 through external conduits extending through fixed frame 125.

Water enters the fixed frame 125 at 128, arrives into shaft 124 through annular chamber 129, which is constantly in communication with a radial channel 127a provided in shaft 124, then flows through cooling circuit 127b, 127c, 127d, 127f and 127g, to be evacuated through channel 127h provided in shaft 124 and through annular chamber 130 formed in frame 125 and which communicates with an outlet pipe 131.

In FIG. 10 (where the elements common with those of FIG. 9 are designated by the same reference numerals), I have shown an embodiment of my invention especially intended for the treatment of more important amounts of materials. The inner dimensions of the furnace are as follows: length 150 mm. and diameter 100 mm. Chamber 101 is formed in a rotary cylinder 132 adapted to drive said chamber 101 through bearings 126. The drive of cylinder 132 and chamber 101 may be performed by means of a belt which drives a pulley disposed axially on one of the faces of the furnace.

Chamber 101 is in this case made of three portions separated from one another by annular elements 105 and 105a made of an insulating material, the end wall 103 and the front wall 109 of chamber 101 being connected to the terminals of a generator.

In the cooling circuit, which is very similar to that illustrated by FIG. 9, I provide annular chambers 129 and 130 which ensure the connection between fixed frame 125 and rotary cylinder 132, joints 133 of the type commonly used to ensure fluid tightness between a fixed part and a rotary part, and toroidal packing joints 134 between rotary cylinder 132 and chamber 101.

In a general manner, the parts which serve to evacuate a maximum of heat into the cooling water are made of copper, with the exception of the inner walls of chamber 101 which are made of steel for reasons of mechanical strength, in particular when the powdery products to be treated are preliminarily compressed in the chamber.

The electric connections 110 and 111 permit of bringing end portion 103 and front wall 109 at different potentials. These connections comprise contacts consisting of brushes 135 carried by fixed frame 125 through an insulating support 136 and rubbing upon axial annular members 137 rigid with the centrifugal chamber 101.

Tests have been made with chambers 101 according to FIGS. 9 and 10.

In the chamber according to FIG. 9, I used, between portions 103 and 104 of chamber 101, potential differences as high as 200 volts with circuit 106 open. With internal heating circuit 106 closed, I produced an arc under a difference of potential of 30 volts and with a current of 50 amperes.

In the embodiment of FIG. 10, of greater size, the voltages applied between portions 103 and 104, in open circuit conditions, ranged from 200 to 1000 volts and I produced, by closing circuit 106, an arc under a potential difference of 40 volts and with a current of 300 amperes. Therefore the respective powers in FIGS. 9 and 10 were 1.5 kw. and 12 kw. inside chamber 101.

It goes without saying that use can be made of only one of the two connections so as thus to produce electric arrangements as illustrated by FIGS. 13, 15 and 17.

In the construction of FIG. 10 as in that of FIG. 9, the annular element 105 of insulating material is protected by providing annular groove 138 in the end wall of chamber 101, the external side of this groove consisting of the surface 123 of insulating annular element 105.

In a likewise manner, the front portion 109 of the chamber is provided with a frusto conical axial projection 139 extending inwardly, opposite the surface 123a of annular element 105a, so as to protect it against the action of the plasma blowpipe. This projection 139 may be provided with a cooling recess (not shown by the drawing).

Thus I obtain a very efficient protection of annular elements 105 and 105a. Under normal conditions of operation, the temperature should not rise above approximately 100° C.

Concerning the blowpipe used in combination with either of the two above described chambers, I advantageously make use of an apparatus including a frusto conical sharp end which constitutes the anode 115 thereof, which blowpipe can be placed in proximity to the inlet of chamber 101.

It may, owing to its shape, be used in combination with other external heating means such as a sun furnace or an image furnace, the convergent radiation issuing from their respective mirrors being not substantially stopped by the presence of the pointed end blowpipe.

The axis of the blowpipe may be in coincidence with that of chamber 101. But these two axes may make a substantial angle with each other.

Advantageously, cathode 115 is made of copper and cathode 116 is made of a bar of tungstene fixed at the end of a hollow cathode support 140 made of copper, which permits an axial supply of the plasma forming fluid.

Centering of the cathode is ensured by two bearings 141 and 142. The front bearing 141, made of an electrically insulating material, is held by the rear end of the frusto conical anode 115 and the rear bearing 141, also made of an electrically insulating material, is engaged with a force fit in the cylindrical body 102 of the blowpipe.

This last mentioned bearing 141 is provided with a chamber 145 for the feed of the plasma forming fluid to the hollow cathode carrier 140. Furthermore, the last mentioned bearing 141 carries an inlet conduit 146 for the cooling water and an outlet conduit 147 for the outflow of said water. This bearing 141 also comprises means 148 for adjusting the position of cathode carrier 140.

The cooling water, which enters through 146, reaches the base of frusto conical part 115. Then it is compelled to move along an inner partition 149 toward the apex of said portion 115. It then flows back, passes through front bearing 142 and along cathode carrier 140 to finally flow out at 147.

The blowpipe is fed with direct current under a working voltage ranging from about 30 volts (argon plasma) to about 100 volts (hydrogen plasma).

Of course chamber 101 might be a fixed chamber.

It might be fed with threephase current.

If it is desired to treat materials which are electrically conductive in the solid state, chamber 101 might be divided into at least two portions separated from each other by an insulating piece and having an insulating jacket. In such a chamber, the end wall 103 would have a free electrically conductive portion, for instance on its axis, so as to permit the formation of an arc inside said chamber.

I might also make use of a centrifugal chamber to treat materials which are conductors of electricity, while ensuring a satisfactory thermal insulation for the walls of said chamber containing, preliminarily packed therein, a refractory material forming a recess extending as far as the end of said chamber, said conducting material being treated and retained in said recess, under the effect of the centrifugal force, in contact with an electric arc established inside the chamber.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A high temperature substance heating device which comprises, in combination a container made of a material transparent to a calorific radiation of high energy concentration, a support for the substance to be heated disposed in said container, means for applying said radiation to said substance through the wall of said container, means for circulating a gas stream through said container on said support, and means for supplying a high frequency current to said gas stream to form a plasma from said gas stream.

2. A high temperature substance heating device which comprises, in combination, a furnace forming a chamber for the substance to be heated, said chamber having an opening, a plasma blowpipe positioned to direct a jet of plasma through said opening into said chamber, said plasma blowpipe having a reflecting surface about its outlet for said jet of plasma, and means for sending calorific radiations of high energy concentration positioned such with respect to said chamber that said radiations be reflected by said reflecting surface into said chamber through said opening.

3. A high temperature furnace comprising a chamber to contain a non-gaseous substance to be heated, a plasma generator positioned to subject said substance in said chamber to the action thereof, a calorific radiation-emitting source operable independently of said plasma, and means to concentrate the radiations emitted from said source on said substance, said plasma having a greater amount of energy than said concentrated radiation energy.

4. A furnace according to claim 3 wherein said chamber includes an aperture and wherein said plasma and said concentrated calorific radiation energy act on said substance in said chamber through said aperture.

5. A furnace according to claim 4 wherein said plasma comprises a blowpipe positioned to direct a jet of plasma through said aperture into said chamber, said blowpipe including a sharp pointed end portion turned toward said opening.

6. A method of heating a non-gaseous substance to a very high temperature which comprises subjecting said substance to the action of a plasma and simultaneously subjecting said substance to concentrated calorific radiation energy obtained by concentrating the radiations of a calorific radiation-emitting source, said source operating independently of said plasma to produce said radiations, and said plasma having a greater amount of energy than said concentrated radiation energy.

7. A method according to claim 6 wherein said substance absorbs said concentrated calorific radiation energy to a greater extent at higher temperatures than at lower temperatures.

8. A method according to claim 7 which comprises maintaining the heating of said substance under the sole action of said concentrated calorific radiation once said temperature of said substance reaches a high temperature at which said substance is highly absorbtive of concentrated radiation energy.

References Cited by the Examiner

UNITED STATES PATENTS

| 2,793,018 | 5/1957 | Trombe | 126—270 X |
| 2,826,671 | 3/1958 | Gayley | 219—75 |
| 2,943,174 | 6/1960 | Parker | 219—10.47 |
| 3,147,329 | 9/1964 | Gage | 219—121 X |

JOSEPH V. TRUHE, *Primary Examiner.*

ANTHONY BARTIS, *Examiner.*